(12) United States Patent
Nobuta et al.

(10) Patent No.: US 11,270,846 B2
(45) Date of Patent: Mar. 8, 2022

(54) SOLID ELECTROLYTIC CAPACITOR AND METHOD FOR MANUFACTURING SOLID ELECTROLYTIC CAPACITOR

(71) Applicant: JAPAN CAPACITOR INDUSTRIAL CO., LTD., Fussa (JP)

(72) Inventors: Tomoki Nobuta, Nagaokakyo (JP); Kazumasa Fujimoto, Nagaokakyo (JP); Osamu Yokokura, Nagaokakyo (JP)

(73) Assignee: JAPAN CAPACITOR INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/015,354

(22) Filed: Sep. 9, 2020

(65) Prior Publication Data

US 2020/0402724 A1    Dec. 24, 2020

Related U.S. Application Data

(63) Continuation of application No. PCT/JP2019/009092, filed on Mar. 7, 2019.

(30) Foreign Application Priority Data

Mar. 13, 2018 (JP) .............................. JP2018-045580

(51) Int. Cl.
*H01G 9/048* (2006.01)
*H01G 9/00* (2006.01)
(Continued)

(52) U.S. Cl.
CPC ........... *H01G 9/048* (2013.01); *H01G 9/0036* (2013.01); *H01G 9/012* (2013.01); *H01G 9/0425* (2013.01); *H01G 9/15* (2013.01); *H01G 9/07* (2013.01)

(58) Field of Classification Search
CPC .................................. H01G 9/15; H01G 9/048
See application file for complete search history.

(56) References Cited

U.S. PATENT DOCUMENTS 6,652,604 B1    11/2003  Nakata et al.
8,159,811 B2     4/2012  Oh
(Continued)

FOREIGN PATENT DOCUMENTS

CN    1247372 A    3/2000
CN    1950915 A    4/2007
(Continued)

OTHER PUBLICATIONS

International Search Report issued for PCT/JP2019/009092, dated May 21, 2019.
(Continued)

*Primary Examiner* — Eric W Thomas
(74) *Attorney, Agent, or Firm* — Arent Fox LLP (57) ABSTRACT

A solid electrolytic capacitor that includes a columnar metal core material having a valve function, the metal core material having a first end surface and a second end surface opposed to the first end surface, at least one of the first end surface and the second end surface having an area larger than that of a cross section of a central portion of the metal core material in a lengthwise direction of the metal core material, and the metal core material having a surface partially provided with a porous layer including an oxide film; a cathode layer including a conductive polymer, the cathode layer being electrically connected to the porous layer, first external terminals electrically connected to the first end surface and the second end surface, respectively; and a second external terminal different in polarity from the first external terminals and electrically connected to the cathode layer.

18 Claims, 7 Drawing Sheets

(51) Int. Cl.
    *H01G 9/012*     (2006.01)
    *H01G 9/042*     (2006.01)
    *H01G 9/15*     (2006.01)
    *H01G 9/07*     (2006.01)

(56) References Cited

U.S. PATENT DOCUMENTS

| | | | |
|---|---|---|---|
| 10,629,383 | B2 | 4/2020 | Nobuta et al. |
| 2007/0242418 | A1 | 10/2007 | Hashimoto |
| 2009/0103234 | A1 | 4/2009 | Oh |
| 2011/0051323 | A1 | 3/2011 | Ning et al. |
| 2014/0036417 | A1* | 2/2014 | Fujimoto .............. H01G 9/055 361/532 |
| 2017/0287647 | A1 | 10/2017 | Nobuta et al. |
| 2019/0006109 | A1 | 1/2019 | Shimamoto et al. |

FOREIGN PATENT DOCUMENTS

| | | | |
|---|---|---|---|
| CN | 102376456 A | 3/2012 | |
| CN | 107275091 A | 10/2017 | |
| EP | 3226270 A1 | 10/2017 | |
| JP | 26-6076 B1 | 10/1951 | |
| JP | S5175954 A | 6/1976 | |
| JP | H0684716 A | 3/1994 | |
| JP | 2005340794 A | 12/2005 | |
| JP | 2006005309 A * | 1/2006 | |
| JP | 2007096284 A * | 4/2007 | ............ H01G 11/56 |
| JP | 2009094475 A | 4/2009 | |
| JP | 2009105370 A | 5/2009 | |
| JP | 2010239065 A | 10/2010 | |
| JP | 2017183555 A | 10/2017 | |
| WO | 2017154374 A1 | 9/2017 | |

OTHER PUBLICATIONS

Written Opinion of the International Searching Authority issued for PCT/JP2019/009092, dated May 21, 2019.
Chinese Office Action issued for Chinese Application No. 201980018782.2, dated Jul. 5, 2021.
Supplementary European Search Report and European Search Opinion issued for EP Application No. 19 76 7469, dated Dec. 3, 2021.

* cited by examiner

SOLID ELECTROLYTIC CAPACITOR AND METHOD FOR MANUFACTURING SOLID ELECTROLYTIC CAPACITOR

CROSS REFERENCE TO RELATED APPLICATIONS

The present application is a continuation of International application No. PCT/JP2019/009092, filed Mar. 7, 2019, which claims priority to Japanese Patent Application No. 2018-045580, filed Mar. 13, 2018, the entire contents of each of which are incorporated herein by reference.

FIELD OF THE INVENTION

The present invention relates to a solid electrolytic capacitor and a method for manufacturing the same.

BACKGROUND OF THE INVENTION

A solid electrolytic capacitor is advantageously used not only as a typical capacitor in a decoupling circuit, a power supply circuit and the like but also as a noise filter for removing high-frequency noise.

As an example of a solid electrolytic capacitor, PTL 1 discloses a solid electrolytic capacitor having a structure in which an anode lead wire is led to an end surface of a capacitor element and an external electrode is formed on the end surface of the capacitor element so as to be connected to the anode lead wire. The external electrode is connected to an end surface of the anode lead wire.

PTL 1: Japanese Patent Laid-Open No. 2009-094475

SUMMARY OF THE INVENTION

However, the solid electrolytic capacitor described in PTL 1 has the anode lead wire and the external electrode with a small connection area therebetween, which increases connection resistance, and a large equivalent series resistance (ESR) is provided, which is a problem.

The present invention solves the above problem, and an object of the present invention is to provide a solid electrolytic capacitor with reduced ESR, and a method for manufacturing such a solid electrolytic capacitor.

According to the present invention, a solid electrolytic capacitor comprises: a columnar metal core material having a valve function, the columnar metal core material having a first end surface and a second end surface opposed to the first end surface, at least one of the first end surface and the second end surface having an area larger than that of a cross section of a central portion of the columnar metal core material in a lengthwise direction of the columnar metal core material, the cross section being orthogonal to an axial direction of the columnar metal core material, and the columnar metal core material having a surface partially provided with a porous layer including an oxide film; a cathode layer including a conductive polymer, the cathode layer being electrically connected to the porous layer; first external terminals electrically connected to the first end surface and the second end surface, respectively; and a second external terminal different in polarity from the first external terminals, the second external terminal being electrically connected to the cathode layer.

The area of the at least one of the first end surface and the second end surface of the columnar metal core material may be larger than that of the cross section of the central portion by 1% or more.

A resist film may be on the surface of the columnar metal core material at a portion thereof free of the porous layer.

The resist film may be a resin including at least one of polyimide and epoxy.

According to the present invention, a method for manufacturing a solid electrolytic capacitor comprises: preparing a columnar metal core material having a valve function; disposing a resist film on a surface of the columnar metal core material; removing at least a portion of the resist film such that the resist film is disposed at predetermined intervals in a lengthwise direction of the columnar metal core material; forming a porous layer on the surface of the columnar metal core material at a portion thereof free of the resist film; subjecting the porous layer to a chemical conversion treatment; applying a material including a conductive polymer to the surface of the columnar metal core material after the chemical conversion treatment to form a conductive polymer layer; dividing the columnar metal core material at a location of the resist film into individual pieces; and forming first external terminals on opposite end surfaces of the columnar metal core material of each individual piece.

According to the present invention, a method for manufacturing a solid electrolytic capacitor comprises: preparing a columnar metal core material having a valve function; disposing a resist film on a surface of the columnar metal core material at predetermined intervals in a lengthwise direction of the columnar metal core material; forming a porous layer on the surface of the columnar metal core material at a portion thereof free of the resist film; subjecting the porous layer to a chemical conversion treatment; applying a material including a conductive polymer to the surface of the columnar metal core material after the chemical conversion treatment to form a conductive polymer layer; dividing the columnar metal core material at a location of the resist film into individual pieces; and forming first external terminals on opposite end surfaces of the columnar metal core material of each individual piece.

The resist film may be a resin including at least one of polyimide and epoxy.

The method for manufacturing a solid electrolytic capacitor may further comprise: forming a carbon layer on the conductive polymer layer; and forming a silver layer on the carbon layer.

A solid electrolytic capacitor of the present invention is configured such that first external terminals are connected to opposite end surfaces of a metal core material and the end surface of the metal core material has an area larger than that of a cross section of a central portion of the metal core material in the lengthwise direction of the metal core material, and a connection area of the metal core material and the first external terminal can thus be increased. Such a configuration can reduce ESR.

In a method for manufacturing a solid electrolytic capacitor according to the present invention, after a resist film is disposed on a surface of a metal core material, the resist film is removed such that the resist film is disposed at predetermined intervals, and a porous layer is formed on the surface of the metal core material at a portion thereof free of the resist film. Then, the metal core material is divided at the location of the resist film into individual pieces, and first external terminals are formed on opposite end surfaces of the metal core material. At least one end surface of the metal core material has an area larger than that of a cross section of a central portion of the metal core material in the lengthwise direction of the metal core material, and a connection area of the metal core material and the first external terminal can be increased, and accordingly, ESR can be reduced.

Furthermore, in a method for manufacturing a solid electrolytic capacitor according to the present invention, a resist film is disposed on a surface of a metal core material at predetermined intervals in the lengthwise direction of the metal core material, and a porous layer is formed on the surface of the metal core material at a portion thereof free of the resist film. Then, the metal core material is divided at the location of the resist film into individual pieces, and first external terminals are formed on opposite end surfaces of the metal core material. At least one end surface of the metal core material has an area larger than that of a cross section of a central portion of the metal core material in the lengthwise direction of the metal core material, and a connection area of the metal core material and the first external terminal can be increased and accordingly, ESR can be reduced.

DETAILED DESCRIPTION OF THE PREFERRED EMBODIMENTS

Hereinafter, features of the present invention will specifically be described with reference to an embodiment of the present invention.

Figure 1:
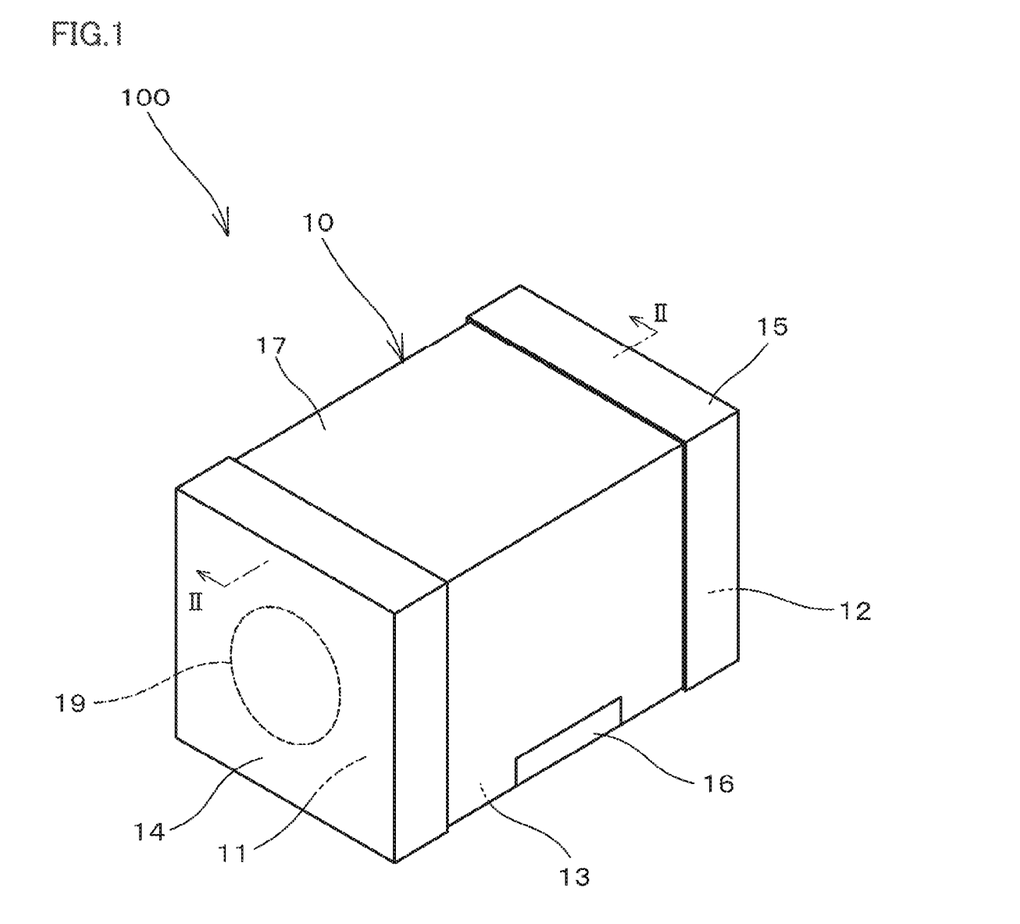
FIG. 1 is a perspective view showing an appearance of a solid electrolytic capacitor according to an embodiment.
Figure 2:
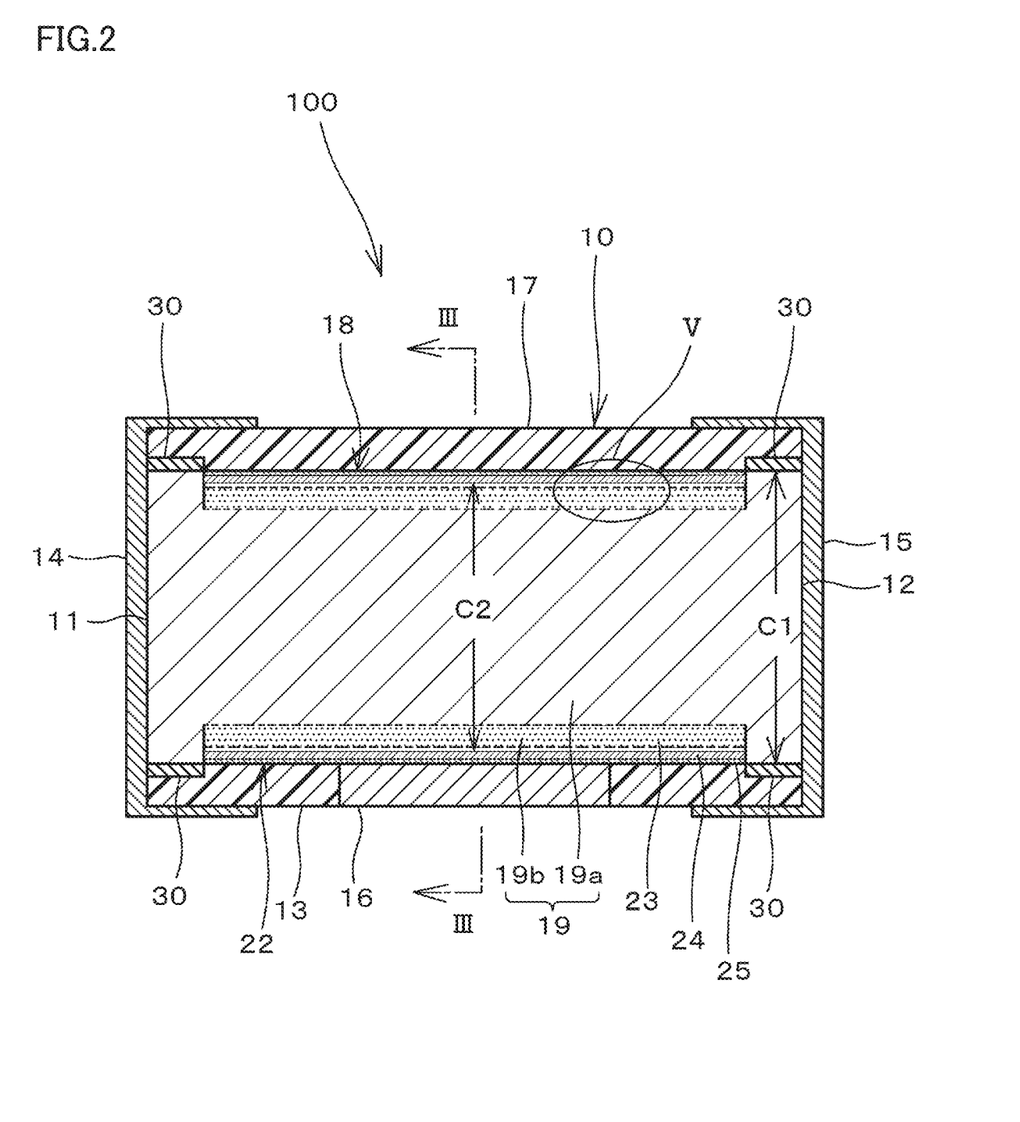
FIG. 2 is a cross section of the solid electrolytic capacitor shown in FIG. 1 taken along a line II-II.
Figure 3:
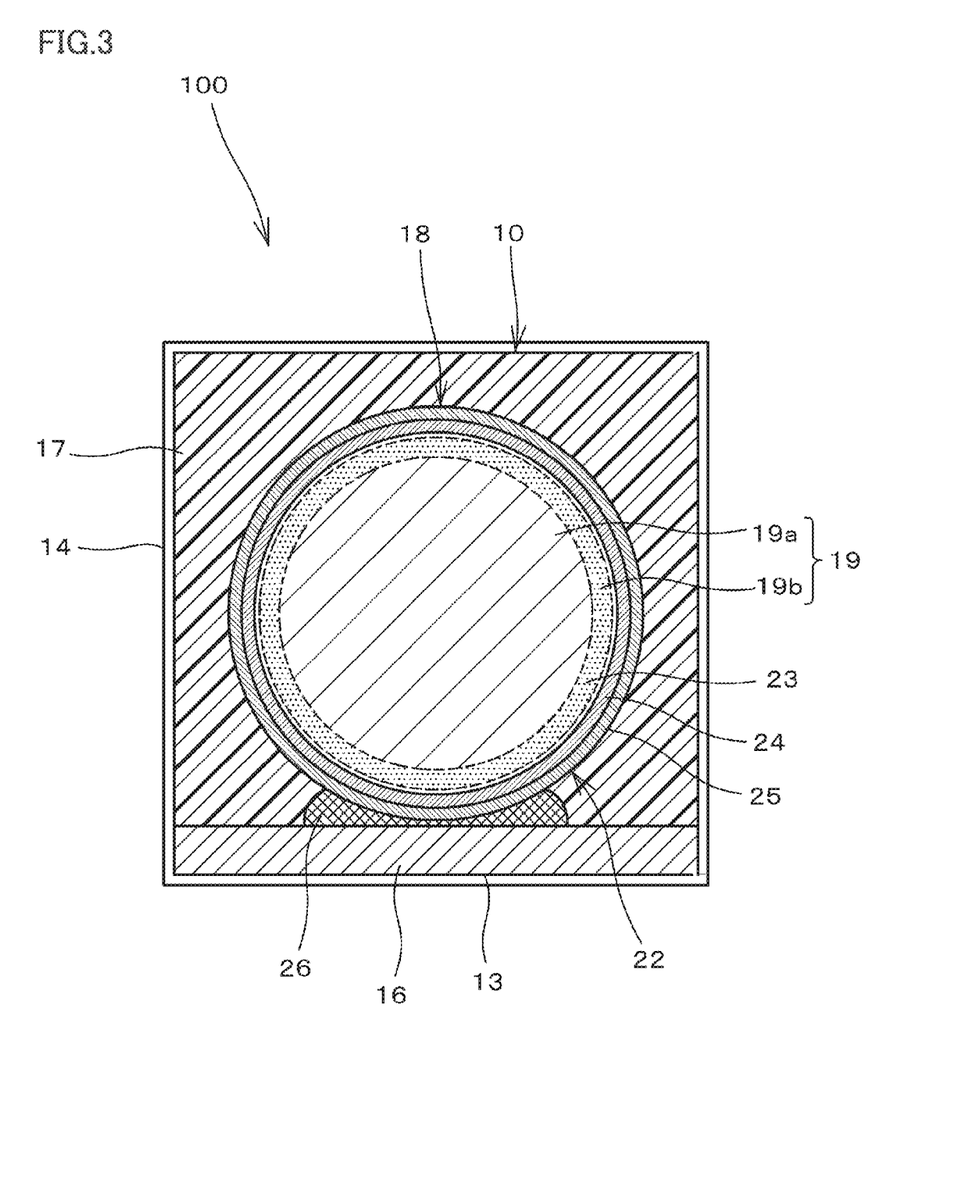
FIG. 3 is a cross section of the solid electrolytic capacitor shown in FIG. 2 taken along a line III-III.
Figure 4:
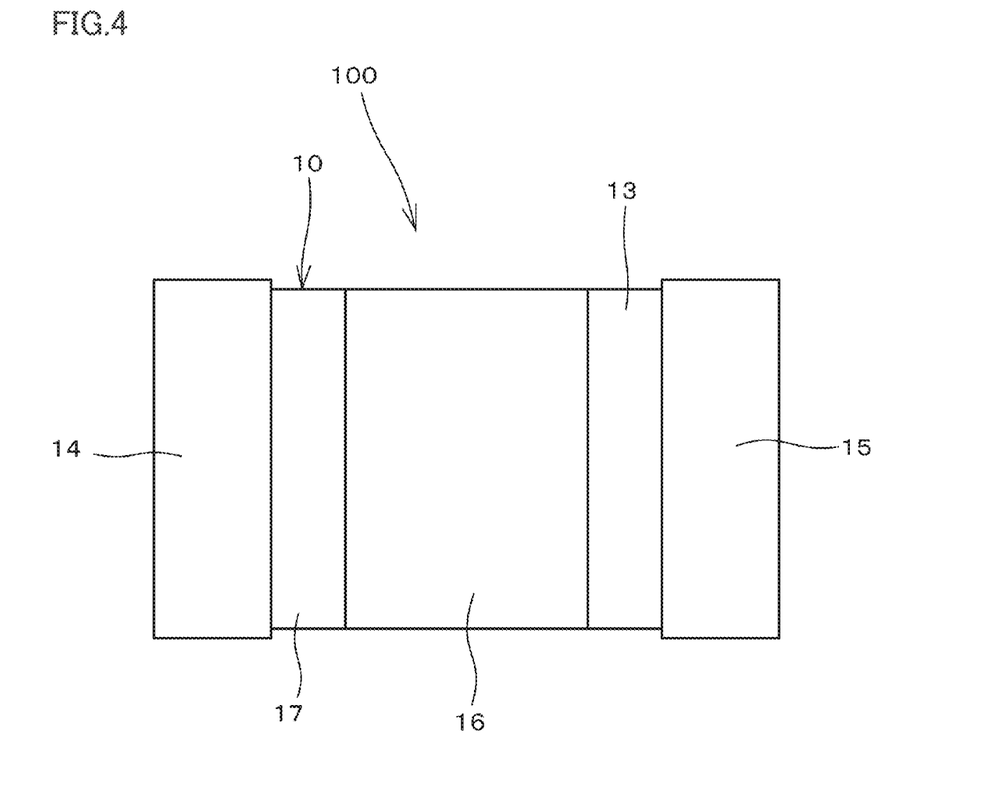
FIG. 4 is a bottom view of the solid electrolytic capacitor shown in FIG. 1.

FIG. 1 is a perspective view showing a solid electrolytic capacitor 100 according to an embodiment of the present invention. FIG. 2 is a cross section of solid electrolytic capacitor 100 shown in FIG. 1 when cut along a cutting line II-II, and FIG. 3 is a cross section of solid electrolytic capacitor 100 shown in FIG. 2 when cut along a cutting line III-III. FIG. 4 is a bottom view of solid electrolytic capacitor 100 shown in FIG. 1.

Solid electrolytic capacitor 100 in one embodiment includes a body 10 in the form of a rectangular parallelepiped, a first anode terminal 14 disposed on an end surface 11 on one side of body 10 and a second anode terminal 15 disposed on an end surface 12 on the other side of body 10, and a cathode terminal 16 disposed on a bottom surface 13 of body 10. First anode terminal 14 and second anode terminal 15 constitute a first external terminal, and cathode terminal 16 constitutes a second external terminal.

Body 10 includes a capacitor element 18 and a sealing material 17 covering capacitor element 18.

Capacitor element 18 includes a columnar metal core material 19 having a valve metal function. As valve metal constituting metal core material 19, for example, aluminum, tantalum, niobium, titanium, or an alloy including at least one thereof is used.

In the present embodiment, metal core material 19 has a circular columnar shape. However, metal core material 19 is not limited in shape to a circular columnar shape, and may for example be a rectangular columnar shape. An aluminum wire is preferably used as metal core material 19 in terms of low cost and availability.

Metal core material 19 includes a core 19a extending in the axial direction of metal core material 19, and a porous layer 19b provided on a portion of a surface of core 19a.

Porous layer 19b is formed for example by etching a surface of metal core material 19 made of aluminum wire to roughen the surface to be a rough surface.

Figure 5:
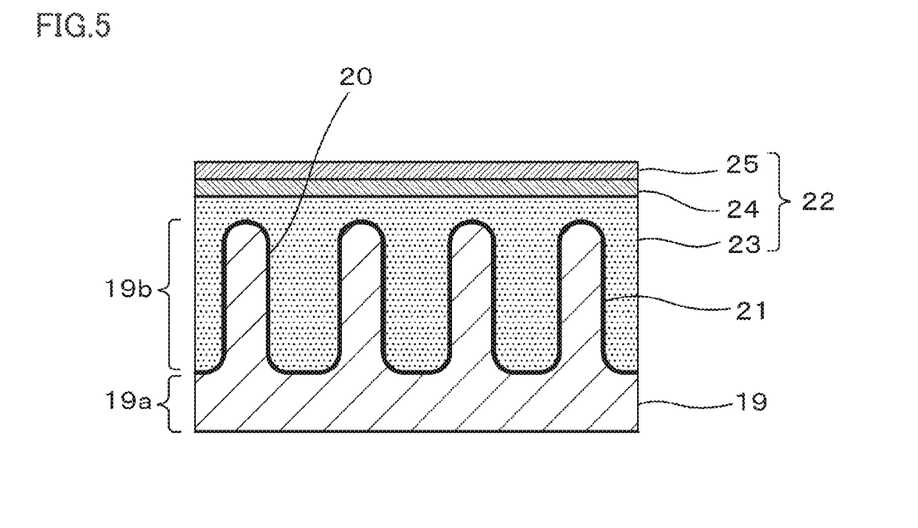
FIG. 5 is a schematic cross section enlarging a portion V of FIG. 2.

As schematically shown in FIG. 5, porous layer 19b has a large number of pores 20 formed to have an opening directed outward. Porous layer 19b has a pore diameter for example of 0.01 μm to 100 μm. In FIG. 3, porous layer 19b is a region surrounded by a dotted line and shaded.

In the present embodiment, an area C1 of the end surface of metal core material 19 is larger than an area C2 of a cross section of a central portion of metal core material 19 in the lengthwise direction of metal core material 19, the cross section being orthogonal to the axial direction of metal core material 19 (see FIG. 2). Preferably, area C1 of the end surface of metal core material 19 is 1% or more larger than area C2 of the cross section of the central portion of metal core material 19 in the lengthwise direction of metal core material 19. When area C1 of the end surface of metal core material 19 is larger than area C2 of the cross section of the central portion of metal core material 19, a connection area of metal core material 19 and first anode terminal 14 and that of metal core material 19 and second anode terminal 15 are increased, and accordingly, ESR can be reduced. Furthermore, when area C1 of the end surface of metal core material 19 is larger than area C2 of the cross section of the central section of metal core material 19 by 1% or more, ESR can be effectively reduced.

As shown in FIG. 5, porous layer 19b has a surface provided with a dielectric layer 21 which is an oxide film. More specifically, dielectric layer 21 is formed along an inner peripheral surface of pore 20 of porous layer 19b. In FIG. 5, dielectric layer 21 is indicated by a thick line.

Dielectric layer 21 is formed, for example, by oxidizing a surface of metal core material 19 provided with porous layer 19b. Dielectric layer 21 is composed of oxide film having a thickness for example of 0.003 μm to 5 μm.

Capacitor element 18 further includes a cathode layer 22 on dielectric layer 21. Cathode layer 22, which is a conductive layer, includes a conductive polymer layer 23 as a solid electrolyte, a carbon layer 24 on conductive polymer layer 23, and a silver layer 25 on carbon layer 24.

As the conductive polymer included in conductive polymer layer 23, a π conjugated conductive polymer can be used. Examples of the π conjugated conductive polymer include substituted or unsubstituted polypyrrole, polythiophene, polyaniline, polyacetylene, poly(p-phenylene), poly(p-phenylenevinylene) and poly(thienylenevinylene), and a derivative thereof.

Examples of the substituent include a hydrogen atom, a hydroxyl group, a carboxyl group, a nitro group, a phenyl group, a vinyl group, a halogen atom, an acyl group, an amino group, a sulfonic acid group, a sulfonyl group, a carboxylate group, a sulfonate group, an alkoxyl group, an alkylthio group, an arylthio group, an alkyl group of C1 to C18 which may have these substituents, a cycloalkyl group of C5 to C12 which may have these substituents, an aryl group of C6 to C14 which may have these substituents, and an aralkyl group of C7 to C18 which may have these substituents.

Inter alia, the conductive polymer is preferably a conductive polymer including at least one selected from the group consisting of polypyrrole, polythiophene and polyaniline, and a derivative thereof. From the viewpoint of thermal stability, the conductive polymer more preferably includes a repeating unit of 3,4-ethylenedioxythiophene or a derivative thereof. The conductive polymer may be a homopolymer or a copolymer. These conductive polymers may be used each alone or in combination of two or more thereof.

Although conductive polymer layer 23 is not particularly limited in thickness, for example, in a case where a low resistance is required, a thin film is preferable from the viewpoint of each layer's volume resistivity, and preferably it is adjusted to have a desired thickness depending on characteristics required as appropriate.

As shown in FIG. 5, conductive polymer layer 23 is provided so as to fill at least a portion of pores 20 of porous layer 19b. Although conductive polymer layer 23 does not necessarily cover the entire peripheral surface of porous layer 19b, conductive polymer layer 23 can be brought into contact with dielectric layer 21 over a large area when conductive polymer layer 23 covers the entire peripheral surface of porous layer 19b. The conductive polymer adhering to resist film 30, which will be described hereinafter, may be removed by a laser or the like, or a mask or the like may be disposed so that the conductive polymer is not applied to resist film 30. This ensures insulation between anode terminals 14 and 15 and cathode terminal 16.

Carbon layer 24 and silver layer 25 of cathode layer 22 function as a cathode layer of capacitor element 18. The cathode layer may be any layer that is electrically conductive. While in the present embodiment the cathode layer is composed of a plurality of layers, that is, carbon layer 24 and silver layer 25, the cathode layer may be composed of silver layer 25 alone.

Porous layer 19b is electrically connected to cathode terminal 16 via cathode layer 22. Cathode layer 22, more specifically, silver layer 25, is connected to cathode terminal 16 via a conductive adhesive 26 (see FIG. 3).

Metal core material 19 has core 19a with opposite end surfaces exposed from sealing material 17. An end surface on one side of metal core material 19 is connected to first anode terminal 14, and an end surface on the other side of metal core material 19 is connected to second anode terminal 15.

First anode terminal 14 and second anode terminal 15 are each composed of a plating film or a conductive resin film formed on the end surface of core 19a of metal core material 19. The plating film includes, for example, a metal such as nickel, zinc, copper, tin, gold, silver, palladium or lead, or an alloy containing at least one of these metals. The conductive resin film includes resin such as epoxy, and metal particles of at least one type for example of silver, copper, nickel, tin and palladium in the resin as a conductive component.

First anode terminal 14 and second anode terminal 15 may each have a multilayer structure including a plating film and a conductive resin film. For example, first anode terminal 14 and second anode terminal 15 may each include two plating layers and a conductive resin layer between the plating layers.

A resist film 30 made of an electrically insulating resin is disposed on the surface of metal core material 19 in a region free of porous layer 19b. Resist film 30 is, for example, a resin including at least one of polyimide and epoxy. A step is not essential between resist film 30 and cathode layer 22. Cathode layer 22 may be larger in thickness than resist film 30. Resist film 30 may have a portion covering cathode layer 22.

Sealing material 17 includes resin. In addition to resin, sealing material 17 may include alumina, silica or a similar filler, or a magnetic material. When sealing material 17 includes the filler, sealing material 17 can be adjusted in mechanical strength and workability. Furthermore, selecting a filler having a desired coefficient of linear expansion allows adjustment in heat shrinkability.

When sealing material 17 includes a magnetic material, the capacitor's impedance can be intentionally increased. For example, antiresonance may occur when a plurality of capacitors having low impedance are mounted in parallel. In that case, when the sealing material includes a magnetic material, antiresonance can be suppressed. As the magnetic material, for example, magnetic powder such as iron powder, iron-containing alloy powder, or ferrite powder is used. The magnetic material may be a mixture of two or more types of powder of different particle sizes or different compositions. As has been discussed above, for sealing material 17, it is preferable to select and use a desired filler, magnetic material or the like depending on the required function.

(Method for Manufacturing Solid Electrolytic Capacitor)

A method for manufacturing solid electrolytic capacitor 100 having the above-described structure will be described with reference to FIGS. 6 and 7.

Figure 6:
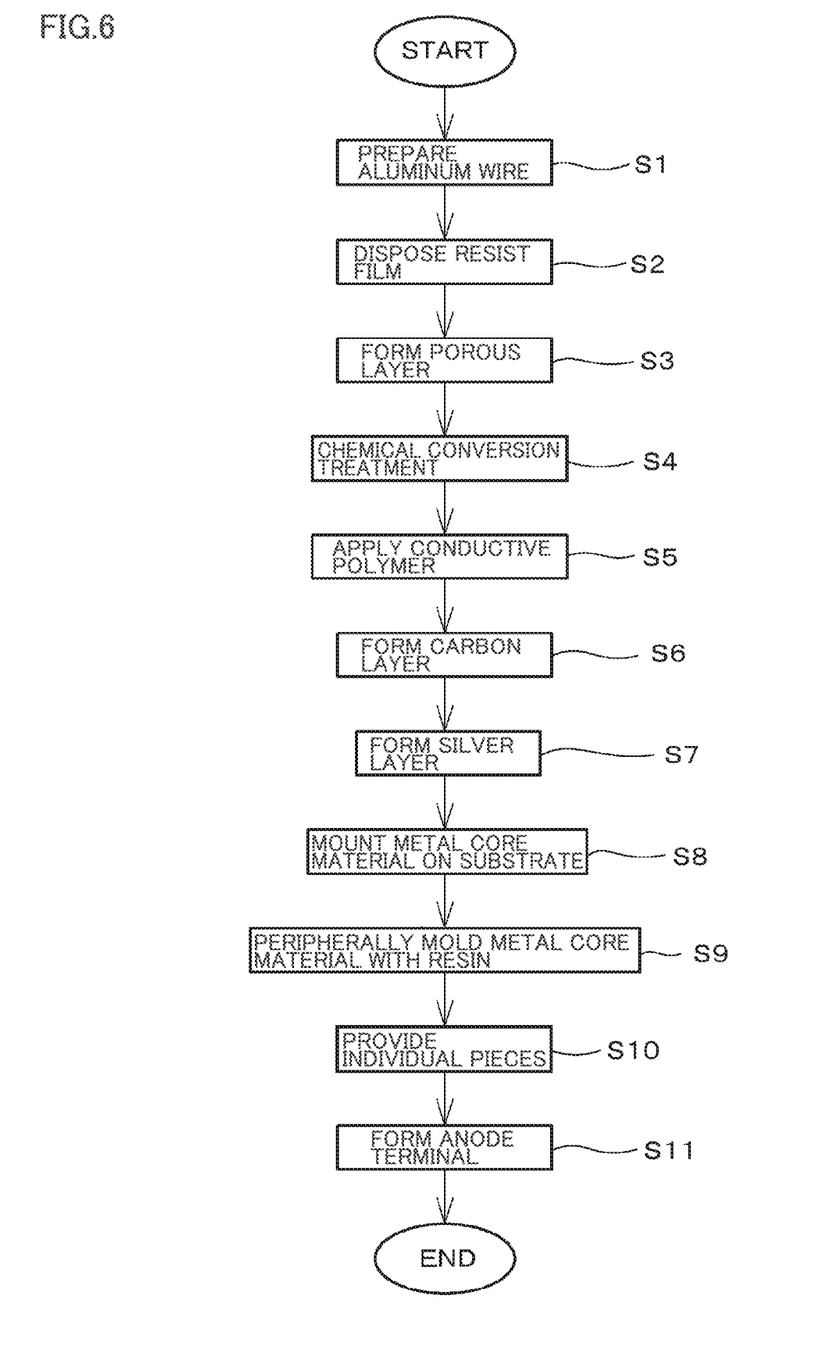
FIG. 6 is a flowchart of a process for manufacturing a solid electrolytic capacitor according to an embodiment.
Figure 7:
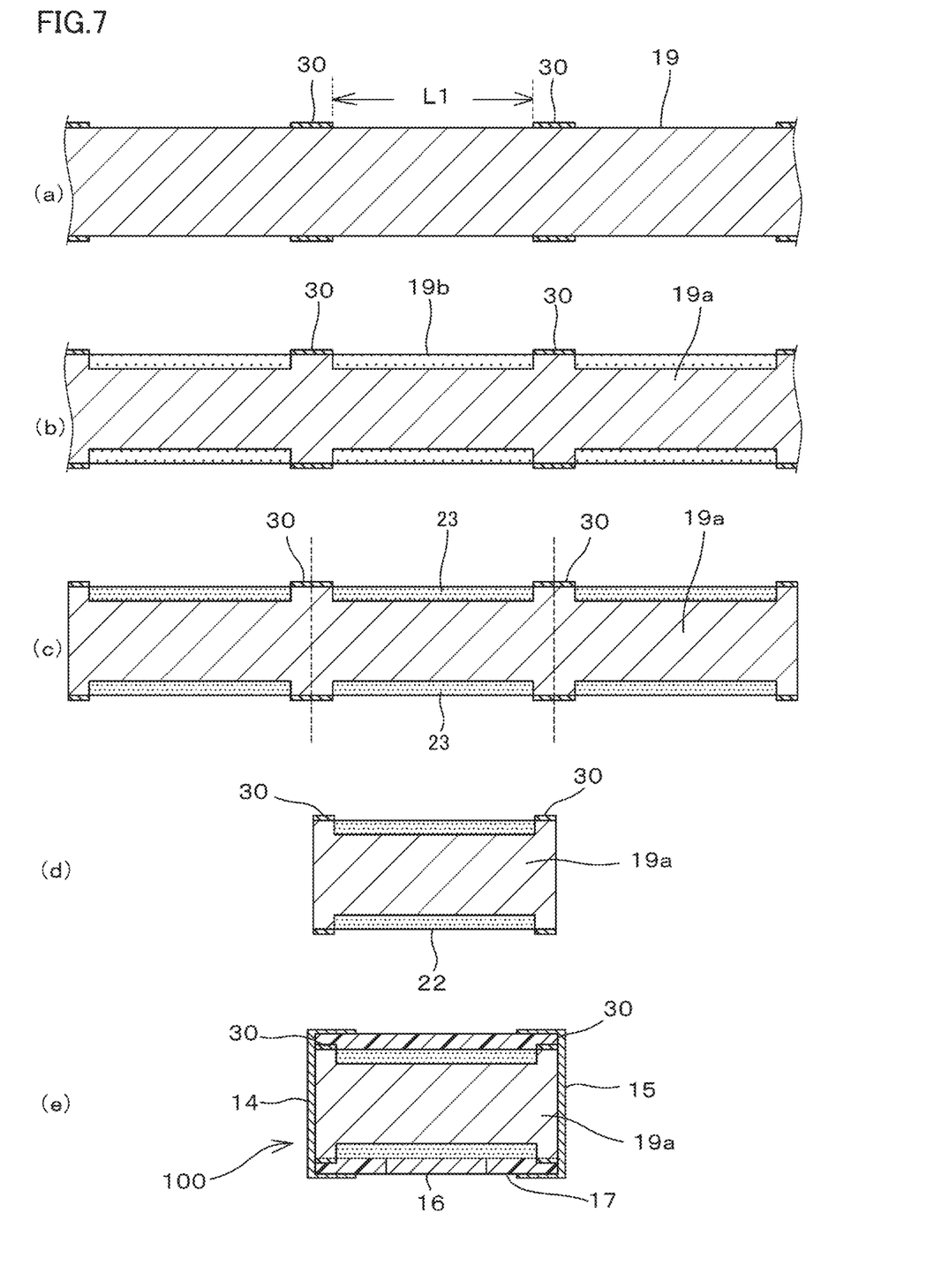
FIG. 7 is a diagram for illustrating a method for manufacturing a solid electrolytic capacitor.

An aluminum wire is prepared as columnar metal core material 19 having a valve function (step S1 in FIG. 6). The aluminum wire has a diameter for example of 0.02 mm to 5.0 mm. As has been discussed above, the aluminum wire is not particularly limited in shape and may have a circular columnar shape or a rectangular columnar shape.

Subsequently, as shown in FIG. 7(a), resist film 30 is disposed at predetermined intervals L1 in the lengthwise direction of the aluminum wire serving as metal core material 19 (step S2 in FIG. 6). As resist film 30, for example, one of a polyimide resin and an epoxy resin can be used. Thus, resist film 30 is disposed on the surface of the aluminum wire in predetermined regions at predetermined intervals L1.

Herein, predetermined interval L1 is for example 0.1 mm to 3.0 mm. The predetermined region in which resist film 30 is disposed has a length for example of 0.1 mm to 3.0 mm.

Instead of step S2 in FIG. 6, there may be provided the steps of: disposing resist film 30 on the entire surface of the aluminum wire serving as metal core material 19; and removing resist film 30 in such a manner that resist film 30 of a predetermined region remains for each predetermined interval L1 in the lengthwise direction of the aluminum wire.

Subsequently, the aluminum wire has a surface etched to form porous layer 19b (step S3 in FIG. 6). As shown in FIG. 7(b), porous layer 19b is formed in a region free of resist film 30. The aluminum wire has the surface etched for example in a method such as alternate-current electrolytic etching, direct-current electrolytic etching, chemical corrosion, or the like.

As has been described above, the aluminum wire has a surface etched to form porous layer 19b in a region free of resist film 30. In a subsequent step described below, the aluminum wire is divided at the location of resist film 30 into individual pieces, and therefore, in a finally manufactured solid electrolytic capacitor, the location of resist film 30 will be an end portion of metal core material 19. Thus, by the above-described process, area C1 of an end surface of metal core material 19 will be larger than area C2 of the cross section of the central portion of metal core material 19.

Subsequently, dielectric layer 21 is formed on a surface of the aluminum wire by chemical conversion treatment (step S4 in FIG. 6). In the chemical conversion treatment, ammonium adipate, for example, is used as a chemical conversion liquid. That is, the aluminum wire has a surface electrochemically oxidized in an aqueous solution of ammonium adipate to form an oxide film constituting dielectric layer 21. The region of the surface of the aluminum wire on which resist film 30 is disposed is not in contact with the chemical conversion liquid, and the oxide film is not formed.

The chemical conversion treatment may be performed after resist film 30 is removed by a laser or the like. In that case, the oxide film formed in the region in which resist film 30 was disposed may be removed by the laser or the like, or may not be removed and instead remain as it is.

Subsequently, a material including a conductive polymer is applied to a surface of the aluminum wire (step S5 in FIG. 6). Specifically, a conductive polymer solution with poly(3,4-ethylenedioxythiophene) dispersed therein is applied so as to penetrate through porous layer 19b, and thereafter the conductive polymer solution is dried to form conductive polymer layer 23 as a solid electrolyte (see FIG. 7(c)).

Herein, in order to fill pores 20 of porous layer 19b with the material including the conductive polymer, the aluminum wire is immersed in the conductive polymer solution. Conductive polymer layer 23 is not formed on the surface of the aluminum wire in a region of the surface of the aluminum wire on which resist film 30 is disposed.

Note that the conductive polymer solution may selectively be applied on porous layer 19b.

When the material including the conductive polymer adheres to the surface of metal core material 19 in a region free of porous layer 19b, the material including the conductive polymer that adheres to the region may be removed by a laser or the like.

Subsequently, carbon layer 24 is formed on conductive polymer layer 23 (step S6 in FIG. 6). Carbon layer 24 can be formed in a method for example of coating, immersing, printing, transferring, or the like for example using carbon paste.

Subsequently, silver layer 25 is formed on carbon layer 24 (step S7 in FIG. 6). Silver layer 25 can be formed in a method for example of coating, immersing, printing, transferring, or the like for example using silver paste.

As has been described above, conductive polymer layer 23, carbon layer 24, and silver layer 25 constitute cathode layer 22 (see FIG. 5).

Subsequently, a substrate on which an electrode to be cathode terminal 16 is disposed is prepared, and the electrode to be cathode terminal 16 and cathode layer 22 are bonded by using conductive adhesive 26 (step S8 in FIG. 6).

Then, metal core material 19 is peripherally molded with resin in such a manner that a surface of cathode terminal 16 that faces outward and the opposite end surfaces of metal core material 19 are exposed (step S9 in FIG. 6). This resin constitutes sealing material 17.

As mentioned above, the aluminum wire is divided at the location of resist film 30 into individual pieces (step S10 in FIG. 6). More specifically, the aluminum wire is divided at a central position of resist film 30 in the lengthwise direction of the aluminum wire, as indicated in FIG. 7(c) by a broken line, into individual pieces (see FIG. 7(d)). This can be done in any method, such as dicing, press-cutting, or cutting a slit on a surface to divide the aluminum wire.

Subsequently, for each individual piece, first anode terminal 14 and second anode terminal 15 are formed so as to be connected to the opposite end surfaces of metal core material 19 exposed from sealing material 17 (step S11 in FIG. 6). First anode terminal 14 and second anode terminal 15 are formed for example by plating the opposite end surfaces of metal core material 19. This can be done for example by electrolytic plating or electroless plating.

Note that aluminum has a property allowing oxide film to be easily formed, and oxide film can be a factor to prevent close adhesion of a plating film. In the present embodiment, an aluminum wire is used as metal core material 19, and accordingly, in order to form a closely adhesive plating film, a zincate treatment is initially performed and plating is subsequently performed. Specifically, a Pd containing solution is applied to metal core material 19, a zincate treatment is performed to precipitate Ni through substitution, and Sn plating is applied on Ni plating.

Through the above-described process, solid electrolytic capacitor 100 can be manufactured (see FIG. 7(e)).

(Measurement of ESR)

By the above method, a plurality of types of solid electrolytic capacitors having different ratios K of area C1 of the end surface of metal core material 19 to area C2 of the cross section of the center portion of metal core material 19 were fabricated. The plurality of types of solid electrolytic capacitors had their ESRs measured with a measuring instrument (E4980A) manufactured by KEY SIGHT TECHNOLOGIES.

After the ESR measurement, ratio K of area C1 of the end surface of metal core material 19 to area C2 of the cross section of the central portion of metal core material 19 (i.e., K=C1/C2) was determined.

Herein, ten solid electrolytic capacitors were prepared for each of the plurality of types of solid electrolytic capacitors having different ratios K and their respective ESRs and ratios K were obtained, and the ten solid electrolytic capacitors' average ESR and ratio K values were obtained.

Table 1 shows a relationship between ratio K of area C1 of the end surface of metal core material 19 to area C2 of the cross section of the center portion of metal core material 19 and ESR.

TABLE 1

| ratio K (%) (end surface's area C1/ central portion's cross-sectional area C2) | ESR (mΩ) |
| --- | --- |
| 0.99 | 271 |
| 1.00 | 270 |
| 1.01 | 253 |
| 1.02 | 251 |
| 1.10 | 246 |
| 1.29 | 229 |
| 1.50 | 198 |

As shown in Table 1, with reference to area C2 of the cross section of the central portion of metal core material 19 being equal to area C1 of the end surface of metal core material 19, that is, with a ratio K of 1 serving a reference, for a ratio K larger than 1, a reduced ESR was provided. For example, for a ratio K of 1, an ESR of 270 mΩ was provided, and for a ratio K of 1.01, that is, when area C1 of the end surface of metal core material 19 was 1% larger than area C2 of the cross section of the central portion of metal core material 19, an ESR of 253 mΩ was provided. As ratio K increases, that is, as area C1 of the end surface of metal core material 19 increases relative to area C2 of the cross section of the center portion of metal core material 19, ESR decreases.

The present invention is not limited to the above embodiment, and a variety of types of applications and modifications can be made within the scope of the present invention.

REFERENCE SIGNS LIST 10 body
11 end surface of one side of the body
12 end surface of the other side of the body
13 bottom surface of the body
14 first anode terminal
15 second anode terminal
16 cathode terminal
17 sealing material
18 capacitor element
19 metal core material
19a core
19b porous layer
20 pore
21 dielectric layer
22 cathode layer
23 conductive polymer layer
24 carbon layer
25 silver layer
26 conductive adhesive
30 resist film
100 solid electrolytic capacitor

The invention claimed is:

1. A solid electrolytic capacitor comprising:
a columnar metal core material having a valve function, the columnar metal core material having a first end surface and a second end surface opposed to the first end surface, at least one of the first end surface and the second end surface having an area larger than that of a cross section of a central portion of the columnar metal core material in a lengthwise direction of the columnar metal core material, the cross section being orthogonal to an axial direction of the columnar metal core material, and the columnar metal core material having a surface partially provided with a porous layer including an oxide film;
a cathode layer including a conductive polymer, the cathode layer being electrically connected to the porous layer;
first external terminals electrically connected to the first end surface and the second end surface, respectively; and
a second external terminal different in polarity from the first external terminals, the second external terminal being electrically connected to the cathode layer.

2. The solid electrolytic capacitor according to claim 1, wherein the area of the at least one of the first end surface and the second end surface of the columnar metal core material is larger than that of the cross section of the central portion of the columnar metal core material by 1% or more.

3. The solid electrolytic capacitor according to claim 2, further comprising a resist film on the surface of the columnar metal core material at a portion thereof free of the porous layer.

4. The solid electrolytic capacitor according to claim 3, wherein the resist film is a resin including at least one of polyimide and epoxy.

5. The solid electrolytic capacitor according to claim 1, further comprising a resist film on the surface of the columnar metal core material at a portion thereof free of the porous layer.

6. The solid electrolytic capacitor according to claim 5, wherein the resist film is a resin including at least one of polyimide and epoxy.

7. The solid electrolytic capacitor according to claim 1, wherein both of the first end surface and the second end surface having the area larger than that of the cross section of the central portion of the columnar metal core material.

8. The solid electrolytic capacitor according to claim 7, wherein the area of each of the first end surface and the second end surface of the columnar metal core material is larger than that of the cross section of the central portion of the columnar metal core material by 1% or more.

9. The solid electrolytic capacitor according to claim 8, further comprising a resist film on the surface of the columnar metal core material at a portion thereof free of the porous layer.

10. The solid electrolytic capacitor according to claim 9, wherein the resist film is a resin including at least one of polyimide and epoxy.

11. A method for manufacturing a solid electrolytic capacitor, the method comprising:
preparing a columnar metal core material having a valve function;
disposing a resist film on a surface of the columnar metal core material;
removing at least a portion of the resist film such that the resist film is disposed at predetermined intervals in a lengthwise direction of the columnar metal core material;
forming a porous layer on the surface of the columnar metal core material at a portion thereof free of the resist film;
subjecting the porous layer to a chemical conversion treatment to form an oxide film thereon;
applying a material including a conductive polymer to the surface of the columnar metal core material after the chemical conversion treatment to form a conductive polymer layer as at least part of a cathode layer that is electrically connected to the porous layer;
dividing the columnar metal core material at a location of the resist film into individual columnar metal core material pieces, each individual columnar metal core material piece having a first end surface and a second end surface opposed to the first end surface, at least one of the first end surface and the second end surface having an area larger than that of a cross section of a central portion of the individual columnar metal core material piece in a lengthwise direction of the individual columnar metal core material piece, the cross section being orthogonal to an axial direction of the individual columnar metal core material piece;
forming first external terminals on and electrically connected to the first end surface and the second end surface, respectively, of each individual columnar metal core material piece; and
forming a second external terminal different in polarity from the first external terminals and electrically connected to the cathode layer of each individual columnar metal core material piece.

12. The method for manufacturing a solid electrolytic capacitor according to claim 11, wherein the resist film is a resin including at least one of polyimide and epoxy.

13. The method for manufacturing a solid electrolytic capacitor according to claim 11, further comprising:
   forming a carbon layer on the conductive polymer layer; and
   forming a silver layer on the carbon layer.

14. The method for manufacturing a solid electrolytic capacitor according to claim 13, wherein the second external terminal different in polarity from the first external terminals is formed on the silver layer.

15. A method for manufacturing a solid electrolytic capacitor, comprising:
   preparing a columnar metal core material having a valve function;
   disposing a resist film on a surface of the columnar metal core material at predetermined intervals in a lengthwise direction of the columnar metal core material;
   forming a porous layer on the surface of the columnar metal core material at a portion thereof free of the resist film;
   subjecting the porous layer to a chemical conversion treatment to form an oxide film thereon;
   applying a material including a conductive polymer to the surface of the columnar metal core material after the chemical conversion treatment to form a conductive polymer layer as at least part of a cathode layer that is electrically connected to the porous layer;
   dividing the columnar metal core material at a location of the resist film into individual columnar metal core material pieces, each individual columnar metal core material piece having a first end surface and a second end surface opposed to the first end surface, at least one of the first end surface and the second end surface having an area larger than that of a cross section of a central portion of the individual columnar metal core material piece in a lengthwise direction of the individual columnar metal core material piece, the cross section being orthogonal to an axial direction of the individual columnar metal core material piece;
   forming first external terminals on and electrically connected to the first end surface and the second end surface, respectively, of each individual columnar metal core material piece; and
   forming a second external terminal different in polarity from the first external terminals and electrically connected to the cathode layer of each individual columnar metal core material piece.

16. The method for manufacturing a solid electrolytic capacitor according to claim 15, wherein the resist film is a resin including at least one of polyimide and epoxy.

17. The method for manufacturing a solid electrolytic capacitor according to claim 15, further comprising:
   forming a carbon layer on the conductive polymer layer; and
   forming a silver layer on the carbon layer.

18. The method for manufacturing a solid electrolytic capacitor according to claim 17, wherein the second external terminal different in polarity from the first external terminals is formed on the silver layer.

* * * * *